(12) United States Patent
Chiang et al.

(10) Patent No.: US 12,395,624 B2
(45) Date of Patent: Aug. 19, 2025

(54) METHOD AND APPARATUS FOR CODING MODE SELECTION IN VIDEO CODING SYSTEM

(71) Applicant: MEDIATEK INC., Hsinchu (TW)

(72) Inventors: Man-Shu Chiang, Hsinchu (TW); Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 165 days.

(21) Appl. No.: 18/060,641

(22) Filed: Dec. 1, 2022

(65) Prior Publication Data
US 2023/0209042 A1 Jun. 29, 2023

Related U.S. Application Data

(60) Provisional application No. 63/294,426, filed on Dec. 29, 2021.

(51) Int. Cl.
*H04N 19/105* (2014.01)
*H04N 19/132* (2014.01)
*H04N 19/176* (2014.01)
*H04N 19/88* (2014.01)

(52) U.S. Cl.
CPC ......... *H04N 19/105* (2014.11); *H04N 19/132* (2014.11); *H04N 19/176* (2014.11); *H04N 19/88* (2014.11)

(58) Field of Classification Search
CPC .. H04N 19/105; H04N 19/132; H04N 19/176; H04N 19/88; H04N 19/11; H04N 19/119; H04N 19/147; H04N 19/186; H04N 19/593; H04N 19/70; H04N 19/96;
(Continued)

(56) References Cited

U.S. PATENT DOCUMENTS 11,146,815 B2 10/2021 Chen et al.
11,432,004 B2 8/2022 Hsiao et al.
(Continued)

FOREIGN PATENT DOCUMENTS

TW 201840183 A 11/2018
TW 202044841 A 12/2020

OTHER PUBLICATIONS

Chinese language office action dated Nov. 14, 2023, issued in application No. TW 111150369.

*Primary Examiner* — Joseph Suh
(74) *Attorney, Agent, or Firm* — McClure, Qualey & Rodack, LLP

(57) ABSTRACT

A method and apparatus for video coding. According to this method, a set of candidates associated with coding modes or coding parameters is determined. Boundary matching costs associated with the set of candidates are determined, where each of the boundary matching costs is determined, for one target candidate of the set of candidates, by using reconstructed or predicted samples of the current block and neighbouring reconstructed or predicted samples of the current block. The reconstructed or predicted samples of the current block are determined according to the one target candidate. The set of candidates are reordered according to the boundary matching costs. The current block is then encoded or decoded using a final candidate selected from the set of candidates based on reordered candidates of the set of candidates.

17 Claims, 8 Drawing Sheets

(58) Field of Classification Search
CPC .... H04N 19/52; H04N 19/109; H04N 19/139; H04N 19/567; H04N 19/577
See application file for complete search history.

(56) References Cited

U.S. PATENT DOCUMENTS

| | | |
|---|---|---|
| 2003/0108099 A1* | 6/2003 | Nagumo .................. G06T 9/20 375/E7.199 |
| 2016/0286229 A1 | 9/2016 | Li |
| 2018/0184117 A1 | 6/2018 | Chen |
| 2018/0241998 A1 | 8/2018 | Chen |
| 2018/0302631 A1* | 10/2018 | Chiang ............... H04N 19/176 |
| 2020/0344492 A1 | 10/2020 | Hsiao |
| 2021/0266595 A1 | 8/2021 | Su |
| 2021/0321092 A1* | 10/2021 | Zhang ................. H04N 19/517 |
| 2023/0224455 A1 | 7/2023 | Chiang |
| 2024/0323353 A1 | 9/2024 | Zhang |

* cited by examiner

METHOD AND APPARATUS FOR CODING MODE SELECTION IN VIDEO CODING SYSTEM

CROSS REFERENCE TO RELATED APPLICATIONS

The present invention is a non-Provisional Application of and claims priority to U.S. Provisional Patent Application No. 63/294,426 filed on Dec. 29, 2021. The U.S. Provisional Patent Application is hereby incorporated by reference in its entirety.

FIELD OF THE INVENTION

The present invention relates to video coding system. In particular, the present invention relates to reordering mode candidates according to boundary matching costs to improve coding efficiency.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Among various new coding tools, some coding tools relevant to the present invention are reviewed as follows.

Inter Prediction Overview

According to JVET-T2002 Section 3.4. (Jianle Chen, et. al., "Algorithm description for Versatile Video Coding and Test Model 11 (VTM 11)", Joint Video Experts Team (JVET) of ITU-T SG 16 WP 3 and ISO/IEC JTC 1/SC 29, 20th Meeting, by teleconference, 7-16 Oct. 2020, Document: JVET-T2002)), for each inter-predicted CU, motion parameters consist of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU, which are obtained from neighbouring CUs, including spatial and temporal candidates, and additional schedules introduced in VVC. The merge mode can be applied to any inter-predicted CU, not only for skip mode. The alternative to the merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of new and refined inter prediction coding tools listed as follows:

Extended merge prediction
Merge mode with MVD (MMVD)
Symmetric MVD (SMVD) signalling
Affine motion compensated prediction
Subblock-based temporal motion vector prediction (SbTMVP)
Adaptive motion vector resolution (AMVR)
Motion field storage: $1/16^{th}$ luma sample MV storage and 8×8 motion field compression
Bi-prediction with CU-level weight (BCW)
Bi-directional optical flow (BDOF)
Decoder side motion vector refinement (DMVR)
Geometric partitioning mode (GPM)
Combined inter and intra prediction (CIIP)

The following description provides the details of those inter prediction methods specified in VVC.

Extended Merge Prediction

In VVC, the merge candidate list is constructed by including the following five types of candidates in order:
1) Spatial MVP from spatial neighbour CUs
2) Temporal MVP from collocated CUs
3) History-based MVP from an FIFO table
4) Pairwise average MVP
5) Zero MVs.

The size of merge list is signalled in sequence parameter set (SPS) header and the maximum allowed size of merge list is 6. For each CU coded in the merge mode, an index of best merge candidate is encoded using truncated unary binarization (TU). The first bin of the merge index is coded with context and bypass coding is used for remaining bins.

The derivation process of each category of the merge candidates is provided in this session. As done in HEVC, VVC also supports parallel derivation of the merge candidate lists (or called as merging candidate lists) for all CUs within a certain size of area.

Spatial Candidate Derivation

The derivation of spatial merge candidates in VVC is the same as that in HEVC except that the positions of first two merge candidates are swapped. A maximum of four merge candidates ($B_0$, $A_0$, $B_1$ and $A_1$) for current CU 210 are selected among candidates located in the positions depicted in FIG. 2. The order of derivation is $B_0$, $A_0$, $B_1$, $A_1$ and $B_2$. Position $B_2$ is considered only when one or more neighbouring CU of positions $B_0$, $A_0$, $B_1$, $A_1$ are not available (e.g. belonging to another slice or tile) or is intra coded. After candidate at position $A_1$ is added, the addition of the remaining candidates is subject to a redundancy check which ensures that candidates with the same motion information are excluded from the list so that coding efficiency is improved. To reduce computational complexity, not all possible candidate pairs are considered in the mentioned redundancy check. Instead, only the pairs linked with an arrow in FIG. 3 are considered and a candidate is only added to the list if the corresponding candidate used for redundancy check does not have the same motion information.

Temporal Candidates Derivation

In this step, only one candidate is added to the list. Particularly, in the derivation of this temporal merge candidate for a current CU 410, a scaled motion vector is derived based on the co-located CU 420 belonging to the collocated reference picture as shown in FIG. 4. The reference picture list and the reference index to be used for the derivation of the co-located CU is explicitly signalled in the slice header. The scaled motion vector 430 for the temporal merge candidate is obtained as illustrated by the dotted line in FIG. 4, which is scaled from the motion vector 440 of the co-located CU using the POC (Picture Order Count) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

The position for the temporal candidate is selected between candidates $C_0$ and $C_1$, as depicted in FIG. 5. If CU at position $C_0$ is not available, is intra coded, or is outside of the current row of CTUs, position $C_1$ is used. Otherwise, position $C_0$ is used in the derivation of the temporal merge candidate.

History-Based Merge Candidates Derivation

The history-based MVP (HMVP) merge candidates are added to the merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 5 History-based MVP (HMVP) candidates may be added to the table. When inserting a new motion candidate to the table, a constrained first-in-first-out (FIFO) rule is utilized where redundancy check is firstly applied to find whether there is an identical HMVP in the table. If found, the identical HMVP is removed from the table and all the HMVP candidates afterwards are moved forward, and the identical HMVP is inserted to the last entry of the table.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy, check operations, the following simplifications are introduced:
1. The last two entries in the table are checked for redundancy with respect to $A_1$ and $B_1$ spatial candidates, respectively.
2. Once the total number of available merge candidates reaches the maximally allowed merge candidates minus 1, the merge candidate list construction process from HMVP is terminated.

Pair-Wise Average Merge Candidates Derivation

Pairwise average candidates are generated by averaging predefined pairs of candidates in the existing merge candidate list, using the first two merge candidates. The first merge candidate is defined as p0Cand and the second merge candidate can be defined as p1Cand, respectively. The averaged motion vectors are calculated according to the availability of the motion vector of p0Cand and p1Cand separately for each reference list. If both motion vectors are available in one list, these two motion vectors are averaged even when they point to different reference pictures, and its reference picture is set to the one of p0Cand; if only one motion vector is available, use the one directly; and if no motion vector is available, keep this list invalid. Also, if the half-pel interpolation filter indices of p0Cand and p1Cand are different, it is set to 0.

When the merge list is not full after pair-wise average merge candidates are added, the zero MVPs are inserted in the end until the maximum merge candidate number is encountered.

Merge Estimation Region

Merge estimation region (MER) allows independent derivation of merge candidate list for the CUs in the same merge estimation region (MER). A candidate block that is within the same MER as the current CU is not included for the generation of the merge candidate list of the current CU. In addition, the updating process for the history-based motion vector predictor candidate list is updated only if (xCb+cbWidth)»Log2ParMrgLevel is greater than xCb»Log2ParMrgLevel and (yCb+cbHeight)»Log2ParMrgLevel is great than (yCb»Log2ParMrgLevel), and where (xCb, yCb) is the top-left luma sample position of the current CU in the picture and (cbWidth, cbHeight) is the CU size. The MER size is selected at the encoder side and signalled as log2_parallel_merge_level_minus2 in the Sequence Parameter Set (SPS).

Merge Mode with MVD (MMVD)

In addition to the merge mode, where the implicitly derived motion information is directly used for prediction samples generation of the current CU, the merge mode with motion vector differences (MMVD) is introduced in VVC. A MMVD flag is signalled right after sending a regular merge flag to specify whether MMVD mode is used for a CU.

In MMVD, after a merge candidate is selected (referred as a base merge candidate in this disclosure), it is further refined by the signalled MVDs information. The further information includes a merge candidate flag, an index to specify motion magnitude, and an index for indication of motion direction. In MMVD mode, one for the first two candidates in the merge list is selected to be used as MV basis. The MMVD candidate flag is signalled to specify which one is used between the first and second merge candidates.

Distance index specifies motion magnitude information and indicates the pre-defined offset from the starting points (612 and 622) for a L0 reference block 610 and L1 reference block 620. As shown in FIG. 6, an offset is added to either horizontal component or vertical component of the starting MV, where small circles in different styles correspond to different offsets from the centre. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

Direction index represents the direction of the MVD relative to the starting point. The direction index can represent the four directions as shown in Table 2. It is noted that the meaning of MVD sign could be variant according to the information of starting MVs. When the starting MVs are an un-prediction MV or bi-prediction MVs with both lists pointing to the same side of the current picture (i.e. POCs of two references both larger than the POC of the current picture, or both smaller than the POC of the current picture), the sign in Table 2 specifies the sign of the MV offset added to the starting MV. When the starting MVs are bi-prediction MVs with the two MVs pointing to the different sides of the current picture (i.e. the POC of one reference larger than the POC of the current picture, and the POC of the other reference smaller than the POC of the current picture), and the difference of POC in list 0 is greater than the one in list 1, the sign in Table 2 specifies the sign of MV offset added to the list0 MV component of the starting MV and the sign for the list1 MV has an opposite value. Otherwise, if the difference of POC in list 1 is greater than list 0, the sign in Table 2 specifies the sign of the MV offset added to the list1 MV component of starting MV and the sign for the list0 MV has an opposite value.

The MVD is scaled according to the difference of POCs in each direction. If the differences of POCs in both lists are the same, no scaling is needed. Otherwise, if the difference of POC in list 0 is larger than the one in list 1, the MVD for list 1 is scaled, by defining the POC difference of L0 as td and POC difference of L1 as tb, described in FIG. 5. If the POC difference of L1 is greater than L0, the MVD for list 0 is scaled in the same way. If the starting MV is un-predicted, the MVD is added to the available MV.

TABLE 2

| Sign of MV offset specified by direction index | | | | |
|---|---|---|---|---|
| Direction IDX | 00 | 01 | 10 | 11 |
| x-axis | + | − | N/A | N/A |
| y-axis | N/A | N/A | + | − |

Affine Motion Compensated Prediction

In HEVC, only translation motion model is applied for motion compensation prediction (MCP). While in the real world, there are many kinds of motion, e.g. zoom in/out, rotation, perspective motions and the other irregular motions. In VVC, a block-based affine transform motion compensation prediction is applied. As shown FIGS. 7A-B, the affine motion field of the block 710 is described by motion information of two control point (4-parameter) in FIG. 7A or three control point motion vectors (6-parameter) in FIG. 7B.

For 4-parameter affine motion model, motion vector at sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad (1)$$

For 6-parameter affine motion model, motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0x}}{H}y + mv_{0y} \end{cases} \quad (2)$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point.

In order to simplify the motion compensation prediction, block based affine transform prediction is applied. To derive motion vector of each 4×4 luma subblock, the motion vector of the centre sample of each subblock, as shown in FIG. 8, is calculated according to above equations, and rounded to 1/16 fraction accuracy. Then, the motion compensation interpolation filters are applied to generate the prediction of each subblock with the derived motion vector. The subblock size of chroma-components is also set to be 4×4. The MV of a 4×4 chroma subblock is calculated as the average of the MVs of the top-left and bottom-right luma subblocks in the collocated 8×8 luma region.

As is for translational-motion inter prediction, there are also two affine motion inter prediction modes: affine merge mode and affine AMVP mode.

Affine Merge Prediction

AF_MERGE mode can be applied for CUs with both width and height larger than or equal to 8. In this mode, the CPMVs (Control Point MVs) of the current CU is generated based on the motion information of the spatial neighbouring CUs. There can be up to five CPMVP (CPMV Prediction) candidates and an index is signalled to indicate the one to be used for the current CU. The following three types of CPVM candidate are used to form the affine merge candidate list:

Inherited affine merge candidates that are extrapolated from the CPMVs of the neighbour CUs Constructed affine merge candidates CPMVPs that are derived using the translational MVs of the neighbour CUs Zero MVs In VVC, there are two inherited affine candidates at most, which are derived from the affine motion model of the neighbouring blocks, one from left neighbouring CUs and one from above neighbouring CUs. The candidate blocks are the same as those shown in FIG. 2. For the left predictor, the scan order is $A_0 \to A_1$, and for the above predictor, the scan order is $B0 \to B_1 \to B_2$. Only the first inherited candidate from each side is selected. No pruning check is performed between two inherited candidates. When a neighbouring affine CU is identified, its control point motion vectors are used to derived the CPMVP candidate in the affine merge list of the current CU. As shown in FIG. 9, if the neighbouring left bottom block A of the current block 910 is coded in affine mode, the motion vectors $v_2$, $v_3$ and $v_4$ of the top left corner, above right corner and left bottom corner of the CU 920 containing block A are attained. When block A is coded with 4-parameter affine model, the two CPMVs of the current CU (i.e., $v_0$ and $v_1$) are calculated according to $v_2$, and $v_3$. In case that block A is coded with 6-parameter affine model, the three CPMVs of the current CU are calculated according to $v_2$, $v_3$ and $v_4$.

Constructed affine candidate means the candidate is constructed by combining the neighbouring translational motion information of each control point. The motion information for the control points is derived from the specified spatial neighbours and temporal neighbour for a current block 1010 as shown in FIG. 10. $CPMV_k$ (k=1, 2, 3, 4) represents the k-th control point. For $CPMV_1$, the B2→B3→A2 blocks are checked and the MV of the first available block is used. For $CPMV_2$, the B1→B0 blocks are checked and for $CPMV_3$, the A1→A0 blocks are checked. For TMVP is used as $CPMV_4$ if it's available.

After MVs of four control points are attained, affine merge candidates are constructed based on the motion information. The following combinations of control point MVs are used to construct in order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

Affine AMVP Prediction

Affine AMVP mode can be applied for CUs with both width and height larger than or equal to 16. An affine flag in the CU level is signalled in the bitstream to indicate whether affine AMVP mode is used and then another flag is signalled to indicate whether 4-parameter affine or 6-parameter affine is used. In this mode, the difference of the CPMVs of current CU and their predictors CPMVPs is signalled in the bitstream. The affine AVMP candidate list size is 2 and it is generated by using the following four types of CPVM candidate in order:

Inherited affine AMVP candidates that extrapolated from the CPMVs of the neighbour CUs Constructed affine AMVP candidates CPMVPs that are derived using the translational MVs of the neighbour CUs Translational MVs from neighbouring CUs Zero MVs The checking order of inherited affine AMVP candidates is the same as the checking order of inherited affine merge candidates. The only difference is that, for AVMP candidate, only the affine CU that has the same reference picture as current block is considered. No pruning process is applied when inserting an inherited affine motion predictor into the candidate list.

Constructed AMVP candidate is derived from the specified spatial neighbours shown in FIG. 10. The same checking order is used as that in the affine merge candidate construction. In addition, the reference picture index of the neighbouring block is also checked. In the checking order, the first block that is inter coded and has the same reference picture as in current CUs is used. When the current CU is coded with the 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, the constructed AMVP candidate is set as unavailable.

If the number of affine AMVP list candidates is still less than 2 after valid inherited affine AMVP candidates and constructed AMVP candidate are inserted, $mv_0$, $mv_1$ and $mv_2$ will be added as the translational MVs in order to predict all control point MVs of the current CU, when available. Finally, zero MVs are used to fill the affine AMVP list if it is still not full.

Affine Motion Information Storage

In VVC, the CPMVs of affine CUs are stored in a separate buffer. The stored CPMVs are only used to generate the inherited CPMVPs in the affine merge mode and affine AMVP mode for the lately coded CUs. The subblock MVs derived from CPMVs are used for motion compensation, MV derivation of merge/AMVP list of translational MVs and de-blocking.

To avoid the picture line buffer for the additional CPMVs, affine motion data inheritance from the CUs of the above CTU is treated differently for the inheritance from the normal neighbouring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in a local buffer. If the candidate CU is 6-parameter affine coded, the affine model is degraded to 4-parameter model. As shown in FIG. 11, along the top CTU boundary, the bottom-left and bottom right subblock motion vectors of a CU are used for affine inheritance of the CUs in bottom CTUs. In FIG. 11, line 1110 and line 1112 indicate the x and y coordinates of the picture with the origin (0,0) at the upper left corner. Legend 1120 shows the meaning of various motion vectors, where arrow 1122 represents the CPMVs for affine inheritance in the local buff, arrow 1124 represents sub-block vectors for MC/merge/skip/AMVP/deblocking/TMVPs in the local buffer and for affine inheritance in the line buffer, and arrow 1126 represents sub-block vectors for MC/merge/skip/AMVP/deblocking/TMVPs.

Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precisions. Dependent on the mode (normal AMVP mode or affine AVMP mode) for the current CU, the MVDs of the current CU can be adaptively selected as follows:

Normal AMVP mode: quarter-luma-sample, half-luma-sample, integer-luma-sample or four-luma-sample.

Affine AMVP mode: quarter-luma-sample, integer-luma-sample or 1/16 luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signalling is needed and quarter-luma-sample MVD precision is used for the current CU. Otherwise, a second flag is signalled to indicate half-luma-sample or other MVD precisions (integer or four-luma sample) is used for a normal AMVP CU. In the case of half-luma-sample, a 6-tap interpolation filter instead of the default 8-tap interpolation filter is used for the half-luma sample position. Otherwise, a third flag is signalled to indicate whether integer-luma-sample or four-luma-sample MVD precision is used for the normal AMVP CU. In the case of affine AMVP CU, the second flag is used to indicate whether integer-luma-sample or 1/16 luma-sample MVD precision is used. In order to ensure the reconstructed MV has the intended precision (quarter-luma-sample, half-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing the CU-level RD check four times for each MVD resolution, the RD check of MVD precisions other than quarter-luma-sample is only invoked conditionally in VTM11. For the normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for the quarter-luma-sample MVD precision is much smaller than that of the integer-luma-sample MVD precision, the RD check of four-luma-sample MVD precision is skipped. Then, the check of half-luma-sample MVD precision is skipped if the RD cost of integer-luma-sample MVD precision is significantly larger than the best RD cost of previously tested MVD precisions. For the affine AMVP mode, if the affine inter mode is not selected after checking rate-distortion costs of affine merge/skip mode, merge/skip mode, quarter-luma-sample MVD precision normal AMVP mode and quarter-luma-sample MVD precision affine AMVP mode, then 1/16 luma-sample MV precision and 1-pel MV precision affine inter modes are not checked. Furthermore, affine parameters obtained in quarter-luma-sample MV precision affine inter mode are used as starting search point in 1/16 luma-sample and quarter-luma-sample MV precision affine inter modes.

Bi-Prediction with CU-Level Weight (BCW)

In HEVC, the bi-prediction signal, $P_{bi-pred}$ is generated by averaging two prediction signals, $P_0$ and $P_1$ obtained from two different reference pictures and/or using two different motion vectors. In VVC, the bi-prediction mode is extended beyond simple averaging to allow weighted averaging of the two prediction signals.

$$P_{bi-pred}=((8-w)*P_0+w*P_1+4)\gg 3 \quad (3)$$

Five weights are allowed in the weighted averaging bi-prediction, w $\in\{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights (w $\in\{3,4,5\}$) are used. At the encoder, fast search algorithms are applied to find the weight index without significantly increasing the encoder complexity. These algorithms are summarized as follows. The details are disclosed in the VTM software and document JVET-L0646 (Yu-Chi Su, et. al., "CE4-related: Generalized bi-prediction improvements combined from JVET-L0197 and JVET-L0296", Joint Video Experts Team (JVET) of ITU-T SG 16 WP 3 and ISO/IEC JTC 1/SC 29, 12th Meeting: Macao, CN, 3-12 Oct. 2018, Document: JVET-L0646).

When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP is also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and weight w is inferred to be 4 (i.e. equal weight is applied). For a merge CU, the weight index is inferred from neighbouring blocks based on the merge candidate index. This can be applied to both the normal merge mode and inherited affine merge mode. For the constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, (i.e., w=4 for equal weight). Equal weight implies the default value for the BCW index.

Combined Inter and Intra Prediction (CIIP)

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value wt is calculated depending on the coding modes of the top and left neighbouring blocks (as shown in FIG. 12) of current CU 1210 as follows:

If the top neighbour is available and intra coded, then set isIntraTop to 1, otherwise set isIntraTop to 0;
If the left neighbour is available and intra coded, then set isIntraLeft to 1, otherwise set isIntraLeft to 0;
If (isIntraLeft+isIntraTop) is equal to 2, then wt is set to 3;
Otherwise, if (isIntraLeft+isIntraTop) is equal to 1, then wt is set to 2;
Otherwise, set wt to 1.

The CIIP prediction is formed as follows:

$$P_{CIIP}=((4-wt)*P_{inter}+wt*P_{intra}+2)>>2 \tag{4}$$

CCLM (Cross Component Linear Model)

The main idea behind CCLM mode (sometimes abbreviated as LM mode) is that some correlation often exists among colour components (e.g., Y/Cb/Cr, YUV and RGB) of colour pictures. These colours may be referred as first colour, second colour and third colour in this disclosure. CCLM technique exploits the correlation by predicting the chroma components of a block from the collocated reconstructed luma samples by linear models whose parameters are derived from already reconstructed luma and chroma samples that are adjacent to the block.

In VVC, the CCLM mode makes use of inter-channel dependencies by predicting the chroma samples from reconstructed luma samples. This prediction is carried out using a linear model in the form $$P(i, j)=a \cdot rec'_L(i, j)+b. \tag{5}$$

Here, P(i, j) represents the predicted chroma samples in a CU and $rec'_L(i, j)$ represents the reconstructed luma samples of the same CU which are down-sampled for the case of non-4:4:4 colour format. The model parameters a and b are derived based on reconstructed neighbouring luma and chroma samples at both encoder and decoder side without explicit signalling.

Three CCLM modes, i.e., CCLM_LT, CCLM_L, and CCLM_T, are specified in VVC. These three modes differ with respect to the locations of the reference samples that are used for model parameter derivation. Samples only from the top boundary are involved in the CCLM_T mode and samples only from the left boundary are involved in the CCLM_L mode. In the CCLM_LT mode, samples from both the top boundary and the left boundary are used.

Overall, the prediction process of CCLM modes consists of three steps:

1) Down-sampling of the luma block and its neighbouring reconstructed samples to match the size of corresponding chroma block,
2) Model parameter derivation based on reconstructed neighbouring samples, and
3) Applying the model equation (1) to generate the chroma intra prediction samples.

Down-sampling of the Luma Component: To match the chroma sample locations for 4:2:0 or 4:2:2 colour format video sequences, two types of down-sampling filter can be applied to luma samples, both of which have a 2-to-1 down-sampling ratio in the horizontal and vertical directions. These two filters correspond to "type-0" and "type-2" 4:2:0 chroma format content, respectively and are given by $$f_1 = \begin{pmatrix} 0 & 1 & 0 \\ 1 & 4 & 1 \\ 0 & 1 & 0 \end{pmatrix}, \tag{6}$$

$$f_2 = \begin{pmatrix} 1 & 2 & 1 \\ 1 & 2 & 1 \end{pmatrix}.$$

Based on the SPS-level flag information, the 2-dimensional 6-tap (i.e., $f_2$) or 5-tap (i.e., $f_1$) filter is applied to the luma samples within the current block as well as its neighbouring luma samples. The SPS-level refers to Sequence Parameter Set level. An exception happens if the top line of the current block is a CTU boundary. In this case, the one-dimensional filter [1, 2, 1]/4 is applied to the above neighboring luma samples in order to avoid the usage of more than one luma line above the CTU boundary.

Model Parameter Derivation Process: The model parameters a and b from eqn. (5) are derived based on reconstructed neighbouring luma and chroma samples at both encoder and decoder sides to avoid the need for any signalling overhead. In the initially adopted version of the CCLM mode, the linear minimum mean square error (LMMSE) estimator was used for derivation of the parameters. In the final design, however, only four samples are involved to reduce the computational complexity. FIG. 13 shows the relative sample locations of M×N chroma block 1310, the corresponding 2M×2N luma block 1320 and their neighbouring samples (shown as filled circles and triangles) of "type-0" content.

In the example of FIG. 13, the four samples used in the CCLM_LT mode are shown, which are marked by triangular shape. They are located at the positions of M/4 and M·3/4 at the top boundary and at the positions of N/4 and N·3/4 at the left boundary. In CCLM_T and CCLM_L modes, the top and left boundary are extended to a size of (M+N) samples, and the four samples used for the model parameter derivation are located at the positions (M+N)/8, (M+N)·3/8, (M+N)·5/8, and (M+N)·7/8.

Once the four samples are selected, four comparison operations are used to determine the two smallest and the two largest luma sample values among them. Let $X_l$ denote the average of the two largest luma sample values and let $X_s$ denote the average of the two smallest luma sample values. Similarly, let $Y_l$ and $Y_s$ denote the averages of the corresponding chroma sample values. Then, the linear model parameters are obtained according to the following equation:

$$a = \frac{Y_l - Y_s}{X_l - X_s} \quad (7)$$

$$b = Y_{s-a} \cdot X_s.$$

In this equation, the division operation to calculate the parameter a is implemented with a look-up table. To reduce the memory required for storing this table, the duff value, which is the difference between the maximum and minimum values, and the parameter a are expressed by an exponential notation. Here, the value of duff is approximated with a 4-bit significant part and an exponent. Consequently, the table for 1/diff only consists of 16 elements. This has the benefit of both reducing the complexity of the calculation and decreasing the memory size required for storing the tables.

MMLM Overview

As indicated by the name, the original CCLM mode employs one linear model for predicting the chroma samples from the luma samples for the whole CU, while in MMLM (Multiple Model CCLM), there can be two models. In MMLM, neighbouring luma samples and neighbouring chroma samples of the current block are classified into two groups, each group is used as a training set to derive a linear model (i.e., particular α and β are derived for a particular group). Furthermore, the samples of the current luma block are also classified based on the same rule for the classification of neighbouring luma samples.

Threshold is calculated as the average value of the neighbouring reconstructed luma samples. A neighbouring sample with Rec'L[x,y]<=Threshold is classified into group 1; while a neighbouring sample with Rec'L[x,y]>Threshold is classified into group 2.

Correspondingly, a prediction for chroma is obtained using linear models:

$$\begin{cases} Pred_C[x, y] = \alpha_1 \times Rec'_L[x, y] + \beta_1 & \text{if } Rec'_L[x, y] \leq \text{Threshold} \\ Pred_C[x, y] = \alpha_2 \times Rec'_L[x, y] + \beta_2 & \text{if } Rec'_L[x, y] > \text{Threshold} \end{cases}$$

Chroma Intra Mode Coding

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 3. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM (derived mode) mode, the intra prediction mode of the corresponding luma block covering the centre position of the current chroma block is directly inherited.

TABLE 3

Derivation of chroma prediction mode from luma mode when CCLM is enabled

| Chroma prediction mode | Corresponding luma intra prediction mode | | | | |
|---|---|---|---|---|---|
| | 0 | 50 | 18 | 1 | X(0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 4.

TABLE 4

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

The first bin indicates whether it is a regular (i.e., 0) or LM mode (i.e., 1). If it is an LM mode, then the next bin indicates whether it is LM_CHROMA (i.e., 0) or not (i.e., 1). If it is not LM_CHROMA, next bin indicates whether it is LM_L (i.e., 0) or LM_A (i.e., 1). For this case, when sps_cclm_enabled_flag is 0, the first bin of the binarization table for the corresponding intra_chroma_pred_mode can be disregarded prior to the entropy coding. Or, in other words, the first bin is inferred to be 0 and hence not coded. This single binarization table is used for both sps_cclm_enabled_flag equal to 0 and 1 cases. The first two bins are context coded with its own context model, and the rest bins are bypass coded.

Multi-Hypothesis Prediction (MHP)

In the multi-hypothesis inter prediction mode (JVET-M0425), one or more additional motion-compensated prediction signals are signalled, in addition to the conventional bi-prediction signal. The resulting overall prediction signal is obtained by sample-wise weighted superposition. With the bi-prediction signal $p_{bi}$ and the first additional inter prediction signal/hypothesis $h_3$, the resulting prediction signal $p_3$ is obtained as follows:

$$p_3 = (1-\alpha)p_{bi} + \alpha h_3 \quad (8)$$

The weighting factor a is specified by the new syntax element add_hyp_weight_idx, according to the following mapping (Table 5):

TABLE 5

Mapping α to add_hyp_weight_idx

| add_hyp_weight_idx | α |
|---|---|
| 0 | ¼ |
| 1 | −⅛ |

Analogously to above, more than one additional prediction signal can be used. The resulting overall prediction signal is accumulated iteratively with each additional prediction signal.

$$p_{n+1} = (1-\alpha_{n+1})p_n + \alpha_{n+1}h_{n+1} \quad (9)$$

The resulting overall prediction signal is obtained as the last $p_n$ (i.e., the $p_n$ having the largest index n). For example, up to two additional prediction signals can be used (i.e., n is limited to 2).

The motion parameters of each additional prediction hypothesis can be signalled either explicitly by specifying the reference index, the motion vector predictor index, and the motion vector difference, or implicitly by specifying a merge index. A separate multi-hypothesis merge flag distinguishes between these two signalling modes.

For inter AMVP mode, MHP is only applied if non-equal weight in BCW is selected in bi-prediction mode. Details of MHP for VVC can be found in JVET-W2025 (Muhammed Coban, et. al., "Algorithm description of Enhanced Compression Model 2 (ECM 2)", Joint Video Experts Team (JVET) of ITU-T SG 16 WP 3 and ISO/IEC JTC 1/SC 29, 23rd Meeting, by teleconference, 7-16 Jul. 2021, Document: JVET-W2025).

Combination of MHP and BDOF is possible, however the BDOF is only applied to the bi-prediction signal part of the prediction signal (i.e., the ordinary first two hypotheses).

BRIEF SUMMARY OF THE INVENTION

A method and apparatus for video coding are disclosed. According to this method, input data associated with a current block are received, where the input data comprise pixel data for the current block to be encoded at an encoder side or encoded data associated with the current block to be decoded at a decoder side. A set of candidates associated with coding modes or coding parameters is determined. Boundary matching costs associated with the set of candidates are determined, where each of the boundary matching costs is determined, for one target candidate of the set of candidates, by using reconstructed or predicted samples of the current block and neighbouring reconstructed or predicted samples of the current block. The reconstructed or predicted samples of the current block are determined according to said one target candidate. The current block is then encoded or decoded using a final candidate selected from the set of candidates based on at least one of the boundary matching cost.

In one embodiment, the set of candidates corresponds to a set of merge candidates associated with merge coding mode. In one embodiment, merge indexes are assigned to the set of merge candidates. A first merge index is assigned a smallest index value for a first merge candidate resulting in a smallest boundary matching cost and a second merge index is assigned a largest index value for a second merge candidate resulting in a largest boundary matching cost. In one embodiment, merge indexes are assigned to the set of merge candidates and a target merge index for a selected merge candidate is signalled at the encoder side or received at the decoder side. In another embodiment, merge indexes are assigned to the set of merge candidates and a target merge index for a selected merge candidate resulting in a smallest boundary matching cost is determined implicitly at the encoder side and the decoder side.

In one embodiment, the set of candidates corresponds to a set of LM (Linear Model) candidates associated with LM prediction between different colour component. In one embodiment, the set of LM candidates comprises at least two LM candidates from a group including Top-Left LM, Top-only LM, Left-only LM and MM (Multiple Model) LM. In one embodiment, LM indexes are assigned to the set of LM candidates, and a target LM index is assigned a smallest index value for a target LM candidate resulting in a smallest boundary matching cost. In another embodiment, a target LM candidate resulting in a smallest boundary matching cost is selected as the final candidate implicitly.

In one embodiment, the set of candidates corresponds to a set of MMVD (Merge Mode with MVD) candidates, wherein each MMVD candidate includes a combination of offset direction and offset distance from a base merge candidate. In one embodiment, MMVD indexes are assigned to the set of MMVD candidates, and a target MMVD index is assigned a smallest index value for a target MMVD candidate resulting in a smallest boundary matching cost. In another embodiment, a target MMVD candidate resulting in a smallest boundary matching cost is selected as the final candidate implicitly.

In one embodiment, a set of equations for determining the boundary matching costs are disclosed.

In one embodiment, a set of candidates are reordered according to the boundary matching costs.

DETAILED DESCRIPTION OF THE INVENTION

Figure 1A:
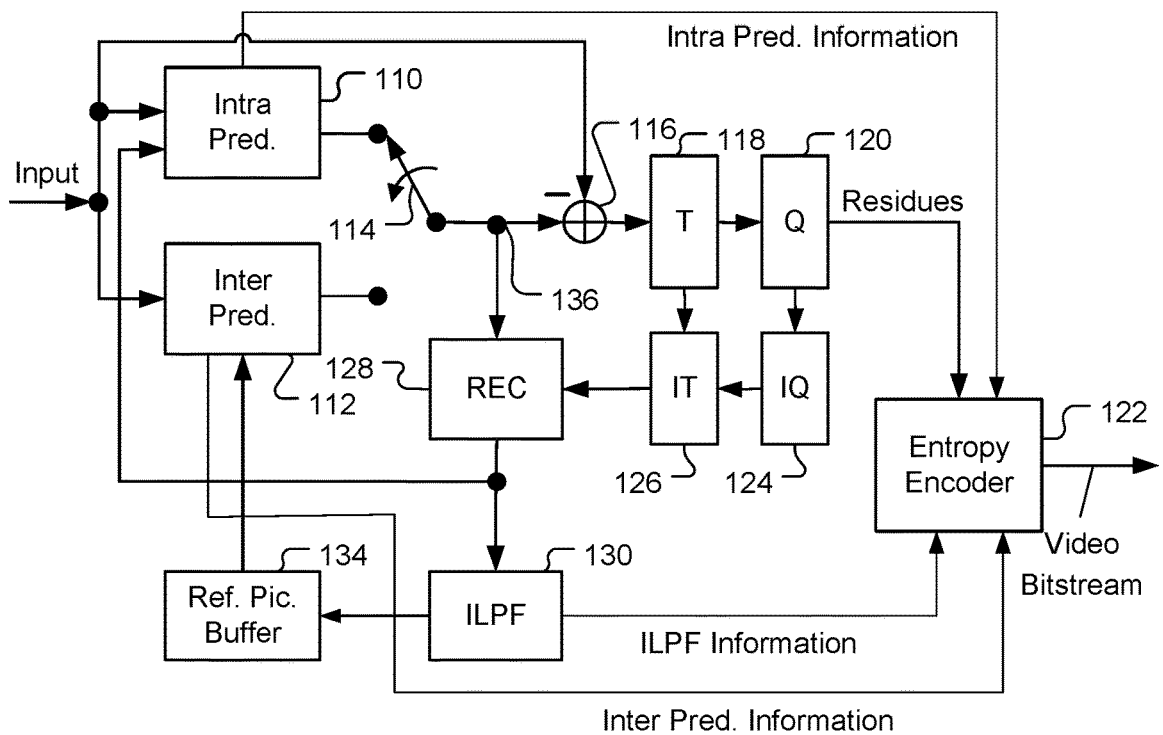
FIG. 1A illustrates an exemplary adaptive Inter/Intra video coding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

With improvement of video coding, more coding tools are developed. However, the coding gain for the new coding tools is not additive. The possible reasons are that
  Considering the syntax overhead, not all new coding modes can be candidate modes for a block.
  With increase of candidate modes for a block, longer codewords are required for indicating a coding mode from multiple candidate modes.

Take merge mode as an example. Compared to HEVC, new merge candidates such as pair-wise average merge candidates, HMVP merge candidates, etc., are proposed to add into the merge candidate list. As mentioned earlier, an index of best merge candidate is encoded/decoded to indicate the selected merge candidate for the current block. However,
  The number of merge candidates in a merge candidate list is limited to a pre-defined number, so not all of merge candidates can be added into the merge candidate list.
  If the number of merge candidates in a merge candidate list increases, codeword length of the index of best merge candidate becomes longer.

Therefore, a scheme is proposed to adaptively reorder the candidate modes. The general rule is shown below.
  Calculate costs for each candidate mode, which can be (but not limited to) merge candidates and/or can be extended to candidate modes for any other tools
  Next, decide the priority order of those candidate modes according to the costs.
    In one embodiment, those candidate modes with smaller costs get higher priority.
    In another embodiment, those candidate modes with smaller costs get lower priority.
  Next, the candidate modes are reordered depending on the priority order.
    The index with a smaller value refers to the candidate mode with a higher priority.
    In other words, the index refers to the candidate mode after reordering.
      Originally, the value of index refers to the index of candidate mode.
      After applying the proposed reordering scheme, the value of index refers to the reordered index of candidate mode.

In another embodiment, for those candidate modes with higher priority, shorter codewords are used for encoding/decoding. In another embodiment, for the candidate mode with the highest priority, it is implicitly set as the coding mode for the current block. In this invention, the scheme to decide the priority order includes boundary matching. For each candidate mode, a boundary matching cost is calculated. The priority order depends on the boundary matching costs for those candidate modes.

Boundary Matching Cost for a Candidate Mode

Figures 14, 15:
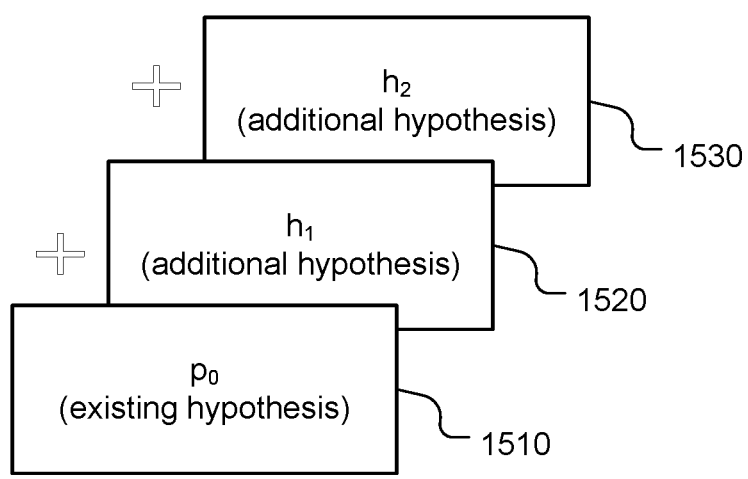
FIG. 14 illustrates an example of boundary samples and neighbouring samples used to derived the boundary matching cost for a candidate mode.
FIG. 15 illustrates an example multiple hypotheses of prediction, where the multiple hypotheses of prediction include an existing hypothesis and two hypotheses of prediction $h_1$ and prediction $h_2$.

A boundary matching cost for a candidate mode refers to the discontinuity measurement (including top boundary matching and/or left boundary matching) between the current prediction (the predicted samples within the current block 1410 shown as a thick box in FIG. 14) generated from the candidate mode and the neighbouring reconstruction (the reconstructed samples within one or more neighbouring blocks). Top boundary matching means the comparison between the current top predicted samples and the neighbouring top reconstructed samples 1420, and left boundary matching means the comparison between the current left predicted samples and the neighbouring left reconstructed samples 1430.

In one embodiment, a pre-defined subset of the current prediction is used to calculate the boundary matching cost. n1 line(s) of top boundary within the current block and/or m1 line(s) of left boundary within the current block are used, where n1 and m1 are integers greater than or equal to 0. Moreover, n2 line(s) of top neighbouring reconstruction and/or m2 line(s) of left neighbouring reconstruction are used, where n2 and m2 are integers greater than or equal to 0.

Here is an example of calculating a boundary matching cost for n1=2, m1=2, n2=2, and m2=2.

$$cost=\Sigma_{x=o}^{block\ width}(|a*pred_{x,0}-b*pred_{x,1}-c*reco_{x,-1}|+|d*reco_{x,-1}-e*pred_{x,0}-f*reco_{x,-2}|)+\Sigma_{y=o}^{block\ height}(|g*pred_{0,y}-h*pred_{1,y}-i*reco_{-1,y}|+|j*reco_{-1,y}-k*pred_{0,y}-l*reco_{-2,y}|)$$

In the above equation, the cost is calculated for the boundary on the top (i.e., the first summation) and the boundary on the left (i.e., the second summation). The terms within the first pair of absolute notations (i.e., $|a*pred_{x,0}-b*pred_{x,1}-c*reco_{x,-1}|$) corresponds to a difference between a pixel in the top line of the current block and two vertical adjacent pixels (i.e., a pixel above (in an above neighbouring line) and a pixel below (in the current block)). The terms within the second pair of absolute notations (i.e., $|d*reco_{x,-1}-e*pred_{x,0}-f*reco_{x,-2}|$) corresponds to a difference between a pixel in the top neighbouring line of the current block and two vertical adjacent pixels (i.e., a pixel above (in an above neighbouring line) and a pixel below (in the current block)). The terms within the third pair of absolute notations (i.e., $|g*pred_{0,y}-h*pred_{1,y}-i*reco_{-1,y}|$) corresponds to a difference between a pixel in the left line of the current block and two horizontal adjacent pixels (i.e., a left pixel (in a left neighbouring line) and a right pixel (in the current block)). The terms within the fourth pair of absolute notations (i.e., $|j*reco_{-1,y}-k*pred_{0,y}-l*reco_{-2,y}|$) corresponds to a difference between a pixel in the left neighbouring line of the current block and two horizontal adjacent pixels (i.e., a left pixel (in a left neighbouring line) and a right pixel (in the current block)). In the above equation, the weights (a, b, c, d, e, f g, h, i, j, k, l) can be any positive integers such as a=2, b=1, c=1, d=2, e=1, f=1, g=2, h=1, i=1, j=2, k=1, and l=1.

Here is another example of calculating a boundary matching cost for n1=2, m1=2, n2=1, and m2=1.

$$cost=\Sigma_{x=o}^{block\ width}(|a*pred_{x,0}-b*pred_{x,1}-c*reco_{x,-1}|)+\Sigma_{y=o}^{block\ height}(|g*pred_{0,y}-h*pred_{1,y}-i*reco_{-1,y}|)$$

In the above equation, the weights (a, b, c, g, h, i) can be any positive integers such as a=2, b=1, c=1, g=2, h=1, and i=1.

Here is another example of calculating a boundary matching cost for n1=1, m1=1, n2=2, m2=2.

$$cost=\Sigma_{x=o}^{block\ width}(|d*reco_{x,-1}-e*pred_{x,0}-f*reco_{x,-2}|)+\Sigma_{y=o}^{block\ height}(|j*reco_{-1,y}-k*pred_{0,y}-l*reco_{-2,y}|)$$

In the above equation, the weights (d, e, f, j, k, l) can be any positive integers such as d=2, e=1, f=1, j=2, k=1, l=1.

Here is another example of calculating a boundary matching cost for n1=1, m1=1, n2=1, m2=1)

$$cost=\Sigma_{x=o}^{block\ width}|a*pred_{x,0}-c*reco_{x,-1}|+\Sigma_{y=o}^{block\ height}|g*pred_{0,y}-i*reco_{-1,y}|$$

In the above equation, the weights (a, c, g, i) can be any positive integers such as a=1, c=1, g=1, i=1.

Here is another example of calculating a boundary matching cost for n1=2, m1=1, n2=2, m2=1.

$$cost=\Sigma_{x=o}^{block\ width}(|a*pred_{x,0}-b*pred_{x,1}-c*reco_{x,-1}|+|d*reco_{x,-1}-e*pred_{x,0}-f*reco_{x,-2}|)+\Sigma_{y=o}^{block\ height}(|g*pred_{0,y}-i*reco_{-1,y}|)$$

In the above equation, the weights (a, b, c, d, e, f, g, i) can be any positive integers such as a=2, b=1, c=1, d=2, e=1, f=1, g=1, i=1.

Here is another example of calculating a boundary matching cost for n1=1, m1=2, n2=1, m2=2.

$$cost=\Sigma_{x=o}^{block\ width}(|a*pred_{x,0}-c*reco_{x,-1}|)+\Sigma_{y=o}^{block\ height}(|g*pred_{0,y}-h*pred_{1,y}-i*reco_{-1,y}|+|j*reco_{-1,y}-k*pred_{0,y}-l*reco_{-2,y}|)$$

In the above equation, the weights (a, c, g, h, i, j, k, l) can be any positive integers such as a=1, c=1, g=2, h=1, i=1, j=2, k=1, l=1.

The following examples for n1 and m1 can also be applied to n2 and m2.

For another example, n1 can be any positive integer such as 1, 2, 3, 4, etc.

For another example, m1 can be any positive integer such as 1, 2, 3, 4, etc.

For another example, n1 and/or m1 vary with block width, height, or area.

According to one example, for a larger block (e.g. area>threshold), a larger m1 is used.
Threshold=64, 128, or 256.
When area>threshold, m1 is increased to 2. (Originally, m1 is 1.)
When area>threshold, m1 is increased to 4. (Originally, m1 is 1 or 2.)

According to another example, for a taller block (e.g. height>threshold*width), a larger m1 is used and/or a smaller n1 is used.
Threshold=1, 2, or 4.
When height>threshold*width, m1 is increased to 2. (Originally, m1 is 1.)
When height>threshold*width, m1 is increased to 4. (Originally, m1 is 1 or 2.)

According to another example, for a larger block (e.g. area>threshold), a larger n1 is used.
Threshold=64, 128, or 256.
When area>threshold, n1 is increased to 2. (Originally, n1 is 1.)
When area>threshold, n1 is increased to 4. (Originally, n1 is 1 or 2.)

According to another example, for a wider block (e.g. width>threshold*height), a larger n1 is used and/or a smaller m1 is used.
Threshold=1, 2, or 4.
When width>threshold*height, n1 is increased to 2. (Originally, n1 is 1.)
When width>threshold*height, n1 is increased to 4. (Originally, n1 is 1 or 2.)

For another example, n1 and/or m1 can be defined in the standard or depend on the signalling/parsing from the syntax at CU/CB, PU/PB, TU/TB, CTU/CTB, slice level, picture level, SPS (Sequence Parameter Set) level, and/or PPS (Picture Parameter Set) level.

In another embodiment, when the current block is located at the top boundary within a CTU row, top boundary matching is not used and/or only left boundary matching is used. (The neighbouring reconstructed samples across CTU rows are not used.)

In another embodiment, when the current block is located at the left boundary within a CTU, left boundary matching is not used and/or only top boundary matching is used.

In another embodiment, when the current block is taller (e.g. height>threshold*width), only left boundary matching is used.

In another embodiment, when the current block is wider (e.g. width>threshold*height), only top boundary matching is used.

In another embodiment, top-left neighbouring reconstructed samples can be used for boundary matching. For example, the boundary matching cost is added with the following term:

$|reco_{-1,-1} - pred_{0,0}|$.

Merge Candidates as Candidate Modes

The proposed scheme can be used to reorder merge candidates. Originally, the index of best merge candidate refers to the order of merge candidates in the merge candidate list. With the proposed scheme, the index (index_best_merge) of the best merge candidate refers to the priority order based on boundary matching costs.

For example, assume that the merge candidate list consists of {cand0, cand1, cand2, cand3, cand4, cand5}. These prediction candidates are referred as a prediction candidate group in this disclosure.

Original Case:
    index_best_merge 0 refers to cand0
    index_best_merge 1 refers to cand1
    index_best_merge 2 refers to cand2
    . . .
Proposed:
    Calculate boundary matching costs {cost_cand0, cost_cand1, cost_cand2, . . . } for each merge candidate
        cost_cand0 is the boundary matching cost for cand0
        cost_cand1 is the boundary matching cost for cand1
        cost_cand2 is the boundary matching cost for cand2
        . . .
    Reorder {cand0, cand1, cand2, . . . } according to boundary matching costs
    In one example,
        If cost_cand0>cost_cand1>cost_cand2>cost_cand3>cost_cand4>cost_cand5, the reordered merge candidates are formed as {cand5, cand4, cand3, cand2, cand1, cand0}.
        After reordering,
        index_best_merge 0 refers to cand5 (The merge candidate with the smallest cost is signalled with the shortest codewords.)
        index_best_merge 1 refers to cand4
        index_best_merge 2 refers to cand3
        . . .
    Otherwise, if cost_cand0<cost_cand1<cost_cand2<cost_cand3<cost_cand4<cost_cand5, the order of the merge candidates is kept the same as the original.
    In another example,
        If cost_cand0<cost_cand1<cost_cand2<cost_cand3<cost_cand4<cost_cand5, the reordered merge candidates are formed as {cand5, cand4, cand3, cand2, cand1, cand0}.
        After reordering,
        index_best_merge 0 refers to cand5 (The merge candidate with the largest cost is signalled with the shortest codewords.)
        index_best_merge 1 refers to cand4
        index_best_merge 2 refers to cand3
    Otherwise, if cost_cand0>cost_cand1>cost_cand2>cost_cand3>cost_cand4>cost_cand5, the order of the merge candidates is kept the same as the original.

In another embodiment, the index_best_merge with a smaller value is coded with a shorter length of codewords. For example, the index_best_merge is coded with truncated unary codewords.

In another embodiment, reordering is applied to a subset of merge candidate list.
    For example, the subset refers to the original first n candidates such as cand0, cand1 and cand2. Then, index_best_merge 0/1/2 refers to the priority order based on boundary matching and index_best_merge 3/4/5 refers to original cand3, cand4 and cand5.
    For another example, the subset refers to the original last n candidates such as cand3, cand4 and cand5. Then, index_best_merge 3/4/5 refers to the priority order based on boundary matching and index_best_merge 0/1/2 refers to original cand0, cand1 and cand2.
    For another example, the subset refers to spatial merge candidates.

In another embodiment, the best merge candidate is inferred to be the merge candidate with the smallest boundary matching cost among all merge candidates. Accordingly, index_best_merge doesn't need to be signalled/parsed by the encoder/decoder and can be inferred as 0.

In another embodiment, the best merge candidate is inferred to be the merge candidate with the largest boundary matching cost among all merge candidates. Accordingly, index_best_merge doesn't need to be signalled/parsed by the encoder/decoder and can be inferred as 0.

In another embodiment, the merge candidates in this section refers to the merge candidates including one or more following candidates:
1) Spatial MVP from spatial neighbour CUs
2) Temporal MVP from collocated CUs
3) History-based MVP from an FIFO table
4) Pairwise average MVP
5) Zero MVs.

In another embodiment, the merge candidates in this section refers to the merge candidates for CIIP. The predicted samples within the current block are generated according to the CIIP process.

In another embodiment, the merge candidates in this section refers to the merge candidates for subblock merging candidates such as affine merge candidates. The predicted samples within the current block are generated according to the affine process.

MMVD as Candidate Modes

The proposed scheme can be used to reorder MMVD candidates to improve the coding efficiency of the syntax of mmvd_cand_flag, mmvd_distance_idx, and/or mmvd_direction_idx. The following table (Table 6) is the syntax table of MMVD in the VVC standard.

TABLE 6

| Syntax table of MMVD in the VVC standard |
| --- |
| if( mmvd_merge_flag[ x0 ][ y0 ] = = 1 ) { |
|   if( MaxNumMergeCand > 1 ) |
|     mmvd_cand_flag[ x0 ][ y0 ]                    ae(v) |
|     mmvd_distance_idx[ x0 ][ y0 ]               ae(v) |
|     mmvd_direction_idx[ x0 ][ y0 ]             ae(v) |

In the above table, mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0]. The array indices x0, y0 specify the location (x0, y0) of the top-left luma sample of the considered coding block relative to the top-left luma sample of the picture.

When mmvd_cand_flag[x0][y0] is not present, it is inferred to be equal to 0.

In the above table, mmvd_cand_flag[x0][y0] specifies whether the first (0) or the second (1) candidate in the merging mmvd_distance_idx[x0][y0] specifies the index used to derive MmvdDistance[x0][y0] as specified in Table 7. The array indices x0, y0 specify the location (x0, y0) of the top-left luma sample of the considered coding block relative to the top-left luma sample of the picture.

TABLE 7

Specification of MmvdDistance[ x0 ][ y0 ] based on mmvd_distance_idx[ x0 ][ y0 ]

| mmvd_distance_idx [ x0 ][ y0 ] | MmvdDistance[ x0 ][ y0 ] | |
|---|---|---|
| | ph_mmvd_fullpel_ only_flag == 0 | ph_mmvd_fullpel_ only_flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

In the above table, mmvd_direction_idx[x0][y0] specifies index used to derive MmvdSign[x0][y0] as specified in Table 8. The array indices x0, y0 specify the location (x0, y0) of the top-left luma sample of the considered coding block relative to the top-left luma sample of the picture.

TABLE 8

Specification of MmvdSign[ x0 ][ y0 ] based on mmvd_direction_idx[ x0 ][ y0 ]

| mmvd_direction_idx [ x0 ][ y0 ] | MmvdSign [ x0 ][ y0 ][ 0 ] | MmvdSign [ x0 ][ y0 ][ 1 ] |
|---|---|---|
| 0 | +1 | 0 |
| 1 | −1 | 0 |
| 2 | 0 | +1 |
| 3 | 0 | −1 |

In the following, we take mmvd_cand_flag as an example to improve the mode selection efficiency. The signaling of mmvd_distance_idx, and mmvd_direction_idx are kept as the same as the original method.

First, calculate boundary matching costs for each MMVD mode, including
MMVD mode 0: MMVD with the first candidate in the merging candidate list
MMVD mode 1: MMVD with the second candidate in the merging candidate list
In one embodiment, after reordering according to the costs,
If cost for MMVD mode 0>cost for MMVD mode 1, mmvd_cand_flag equal to 0 refers to MMVD mode 1 and mmvd_cand_flag equal to 1 refers to MMVD mode 0.

In an alternative way, mmvd_cand_flag is implicit and the first or second candidate (which has a smallest cost) in the merging candidate list is used for MMVD.

In another embodiment, after reordering according to the costs,
If cost for MMVD mode 0<cost for MMVD mode 1, mmvd_cand_flag equal to 0 refers to MMVD mode 1 and mmvd_cand_flag equal to 1 refers to MMVD mode 0.

In an alternative way, mmvd_cand_flag is implicit and the first or second candidate (which has a largest cost) in the merging candidate list is used for MMVD.

Similar way is used when improving mmvd_distance_idx, and/or mmvd_direction_idx.

LM as Candidate Modes

The proposed scheme can be used to reorder LM candidates to improve the syntax of cclm_mode_idx. The following table (Table 9) is the syntax table of LM in the VVC standard.

TABLE 9

Syntax table of LM in the VVC standard

| if( cclm_mode_flag) | |
| cclm_mode_idx | ae(v) |

In the above table, cclm_mode_idx specifies which one of the INTRA_LT_CCLM, INTRA_L_CCLM and INTRA_T_CCLM chroma intra prediction modes is applied.

In the following, we take cclm_mode_idx as an example to improve the mode selection efficiency.

First, calculate boundary matching costs for each LM candidate mode (such as INTRA_LT_CCLM, INTRA_L_CCLM and INTRA_T_CCLM chroma intra prediction modes)

In one embodiment, after reordering according to the costs,
The cclm_mode_idx equal to 0 refers to the LM candidate mode with the smallest cost and cclm_mode_idx equal to 2 refers to the LM candidate mode with the largest cost.

In an alternative way, cclm_mode_idx is implicit and the LM candidate mode (which has a smallest cost) is used.

In another embodiment, after reordering according to the costs,
The cclm_mode_idx equal to 0 refers to the LM candidate mode with the largest cost and bcw_idx equal to 2 refers to the LM candidate mode with the smallest cost.

In an alternative way, cclm_mode_idx is implicit and LM candidate mode (which has a largest cost) is used.

In another embodiment, in addition to CCLM in the overview section (for cb, deriving model parameters from luma and cb; for cr, deriving model parameters from luma and cr), more CCLM variations are disclosed. The following shows some examples.

One variation is for cr:
Deriving model parameters by using neighboring reconstructed samples of cb and cr as the inputs X and Y of model derivation
Then generating cr prediction by the derived model parameters and cb reconstructed samples.
Another variation is MMLM.
Another variation is that for cb (or cr), deriving model parameters from multiple collocated luma blocks.

LM candidate modes (in this section) can also include any LM extentions/variations. With the number of LM candidate modes increases, the coding performance improvement from the proposed becomes more significant.

The proposed reordering scheme for different tools (not limited to those tools in the following examples) can be unified. For example, the proposed reordering scheme for MHP, LM, BCW, MMVD, and/or merge candidates can be unified with the same rule of calculating boundary matching costs.

The proposed methods in this invention can be enabled and/or disabled according to implicit rules (e.g. block width, height, or area) or according to explicit rules (e.g. syntax on block, slice, picture, SPS, or PPS level). For example, the proposed reordering is applied when the block area is smaller than a threshold.

The term "block" in this invention can refer to TU/TB, CU/CB, PU/PB, or CTU/CTB.

The term "LM" in this invention can be viewed as one kind of CCLM/MMLM modes or any other extension/ variation of cross-component tools (e.g. the proposed CCLM extension/variation in this invention). The variations here mean that some optional modes can be selected when the block indication refers to using one of cross-component modes (e.g. CCLM_LT, MMLM_LT, CCLM_L, CCLM_T, MMLM_L, MMLM_T, and/or an intra prediction mode, which is not one of traditional DC, planar, and angular modes) for the current block. The following shows an example of being convolutional cross-component mode (CCCM) as an optional mode. When this optional mode is applied to the current block, cross-component information with a model, including non-linear term, is used to generate the chroma prediction. The optional mode may follow the template selection of CCLM, so CCCM family includes CCCM_LT CCCM_L, and/or CCCM_T.

The proposed methods (for CCLM) in this invention can be used for any other LM modes.

Any combination of the proposed methods in this invention can be applied.

Figure 1B:
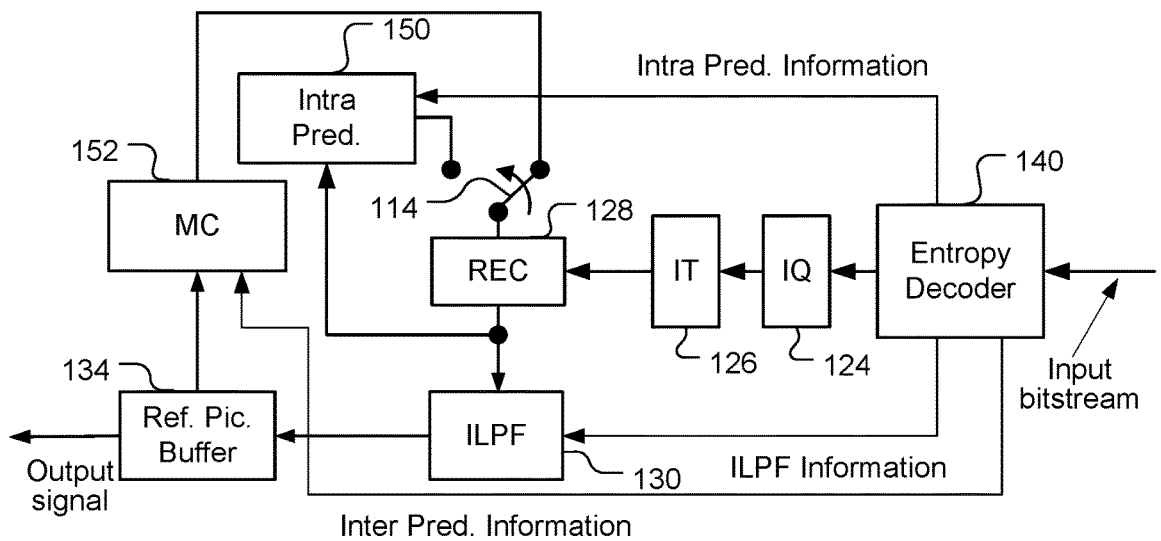
FIG. 1B illustrates a corresponding decoder for the encoder in FIG. 1A.
Figure 2:
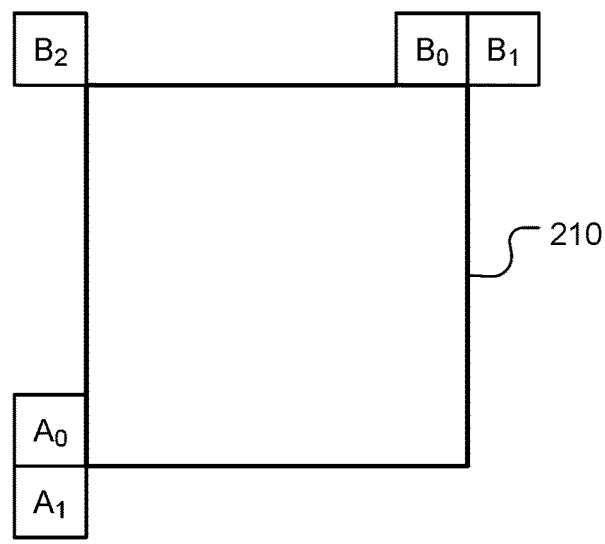
FIG. 2 illustrates the neighbouring blocks used for deriving spatial merge candidates for VVC.
Figure 3:
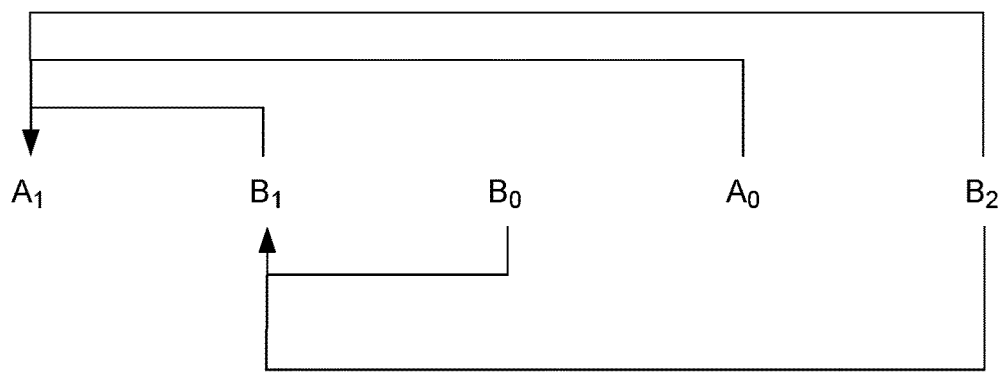
FIG. 3 illustrates the possible candidate pairs considered for redundancy check in VVC.
Figure 4:
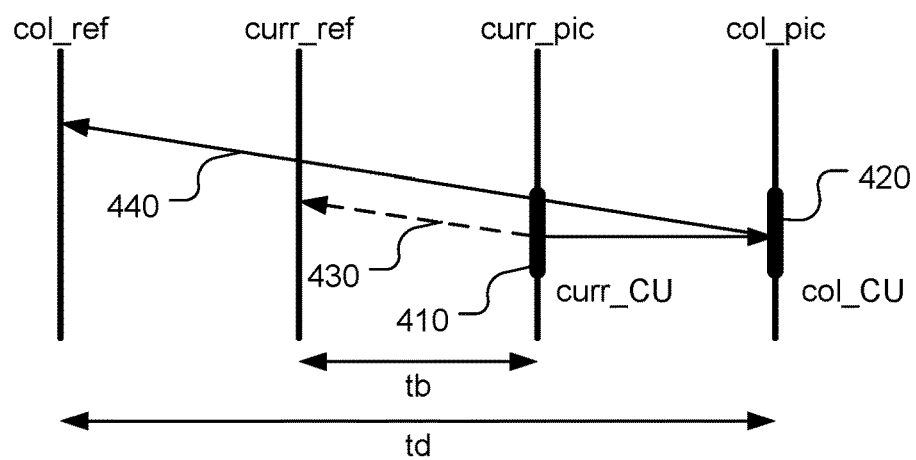
FIG. 4 illustrates an example of temporal candidate derivation, where a scaled motion vector is derived according to POC (Picture Order Count) distances.
Figure 5:
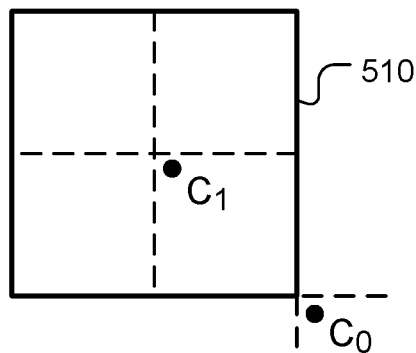
FIG. 5 illustrates the position for the temporal candidate selected between candidates $C_0$ and $C_1$.
Figure 6:
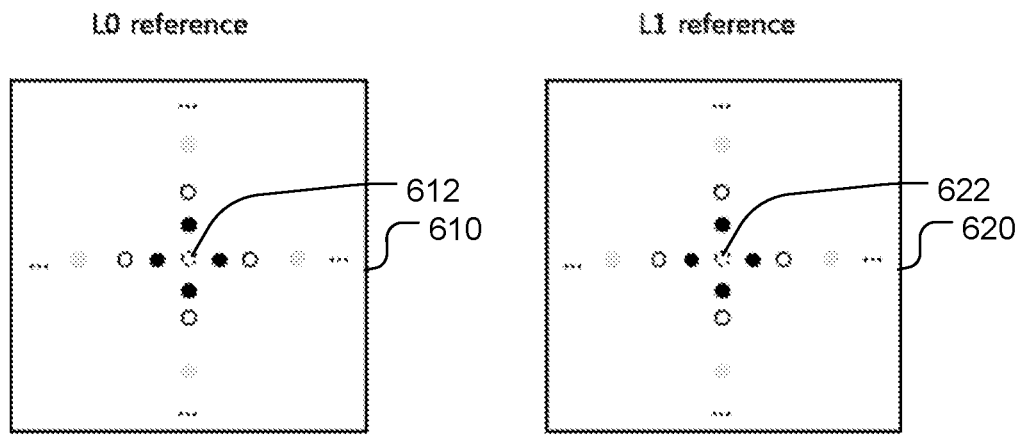
FIG. 6 illustrates the distance offsets from a starting MV in the horizontal and vertical directions according to Merge Mode with MVD (MMVD).
Figure 7A:
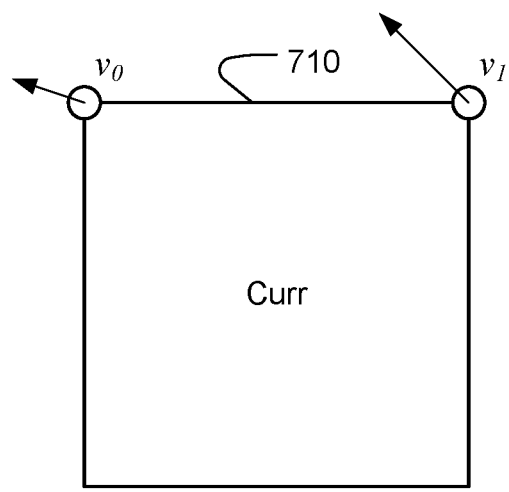
FIG. 7A illustrates an example of the affine motion field of a block described by motion information of two control point (4-parameter).
Figure 7B:
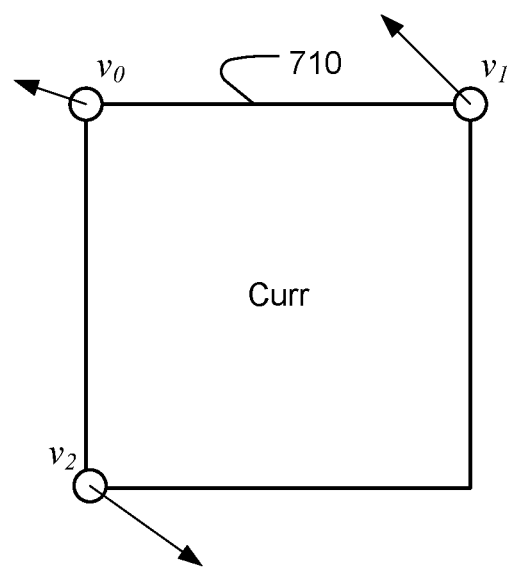
FIG. 7B illustrates an example of the affine motion field of a block described by motion information of three control point motion vectors (6-parameter).
Figure 8:
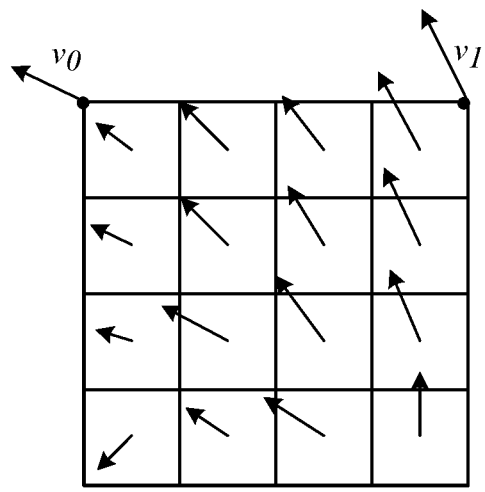
FIG. 8 illustrates an example of block based affine transform prediction, where the motion vector of each 4×4 luma subblock is derived from the control-point MVs.
Figure 9:
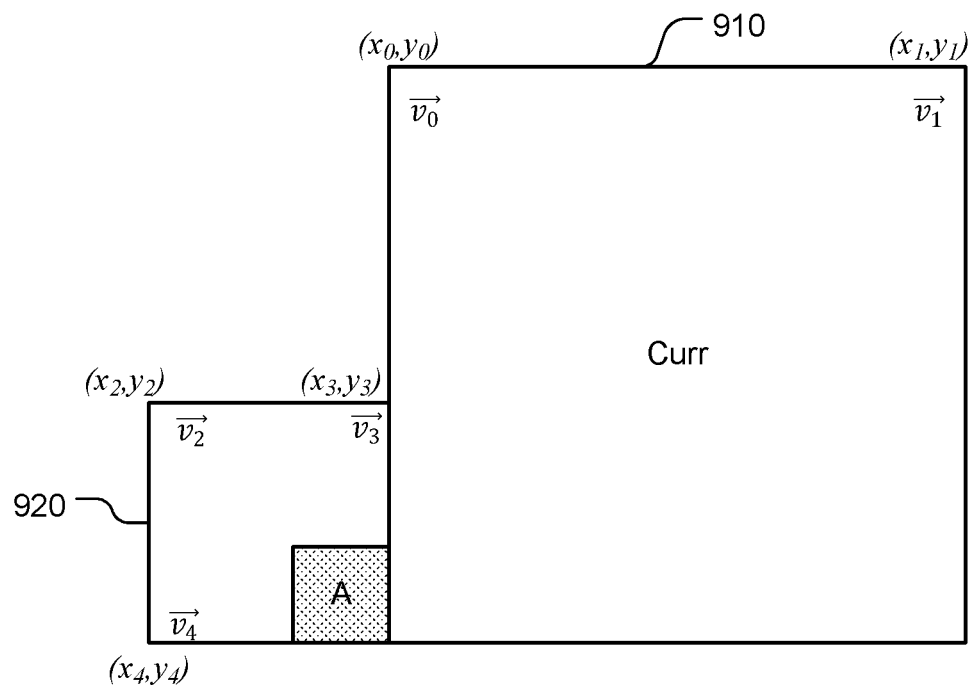
FIG. 9 illustrates an example of derivation for inherited affine candidates based on control-point MVs of a neighbouring block.
Figure 10:
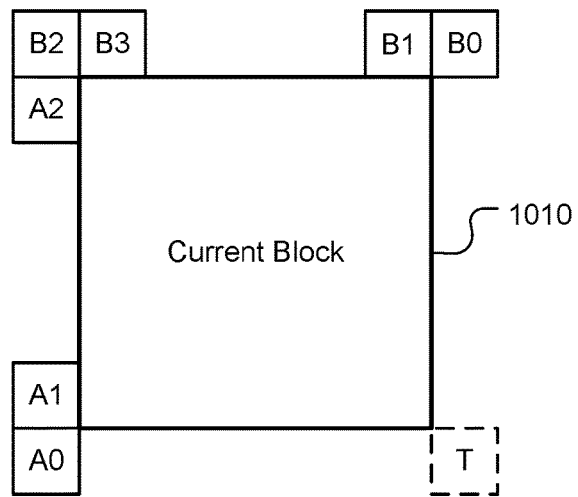
FIG. 10 illustrates an example of affine candidate construction by combining the translational motion information of each control point from spatial neighbours and temporal.
Figure 11:
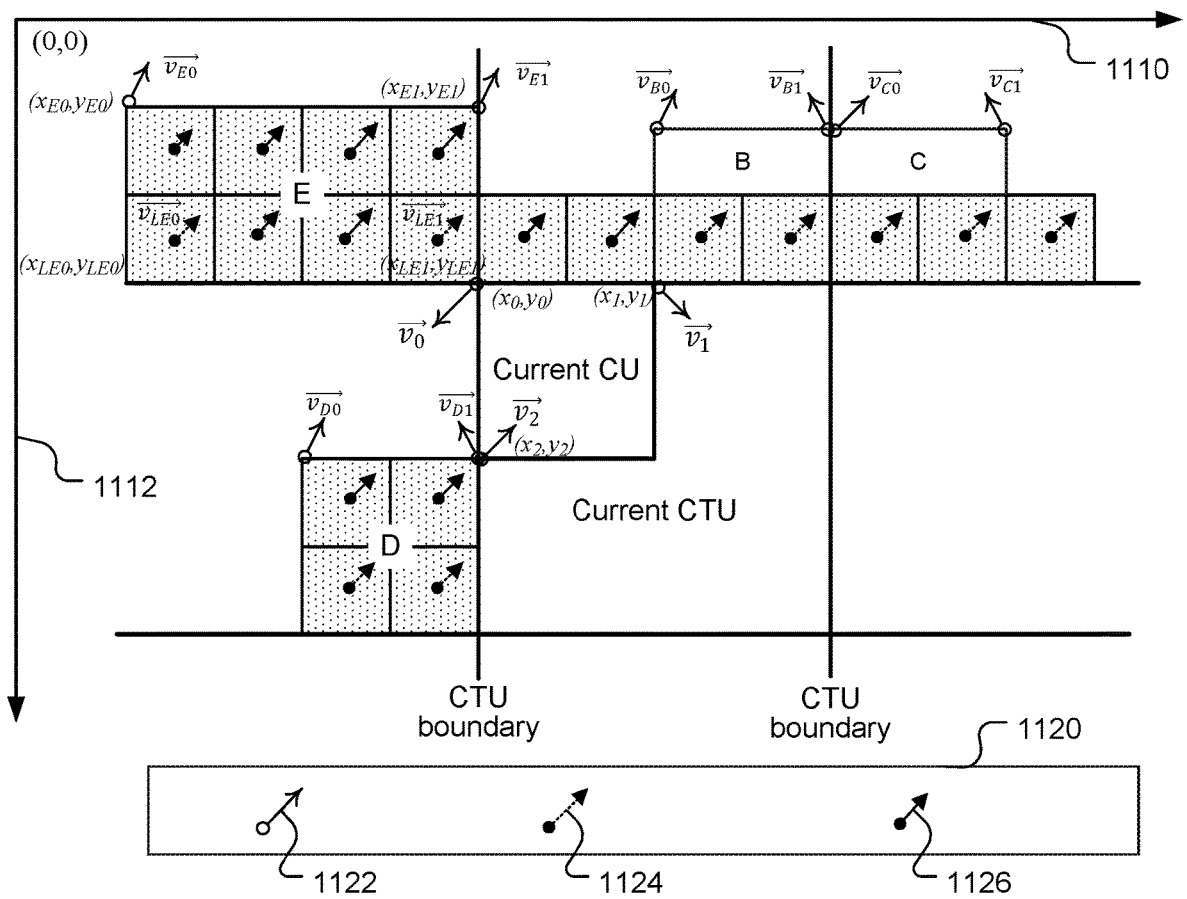
FIG. 11 illustrates an example of affine motion information storage for motion information inheritance.
Figure 12:
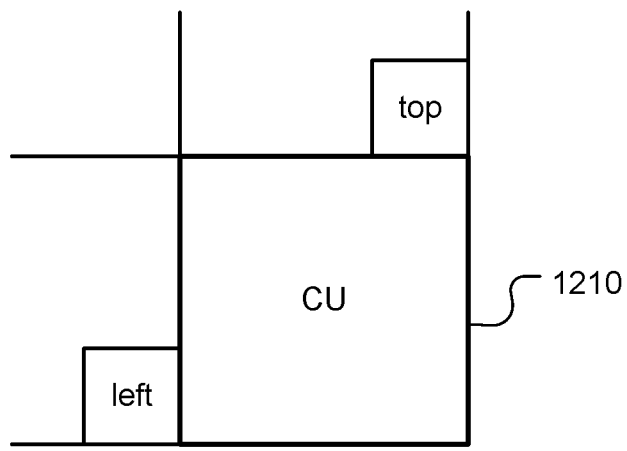
FIG. 12 illustrates an example of the weight value derivation for Combined Inter and Intra Prediction (CIIP) according to the coding modes of the top and left neighbouring blocks.
Figure 13:
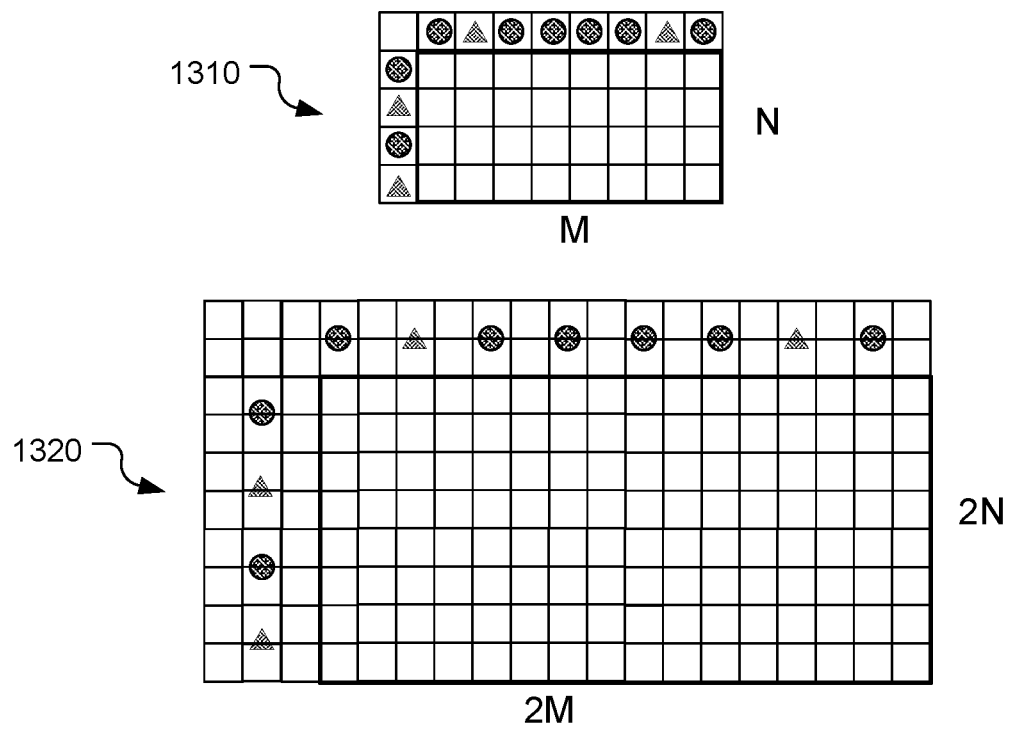
FIG. 13 illustrates an example of model parameter derivation for CCLM (Cross Component Linear Model) using neighbouring chroma samples and neighbouring luma samples.

Any of the foregoing proposed methods can be implemented in encoders and/or decoders. For example, any of the proposed methods can be implemented in an intra/inter coding module of an encoder (e.g. Inter Pred. 112 in FIG. 1A), a motion compensation module (e.g., MC 152 in FIG. 1B), a merge candidate derivation module of a decoder. Alternatively, any of the proposed methods can be implemented as a circuit coupled to the intra/inter coding module of an encoder and/or motion compensation module, a merge candidate derivation module of the decoder.

Figure 16:
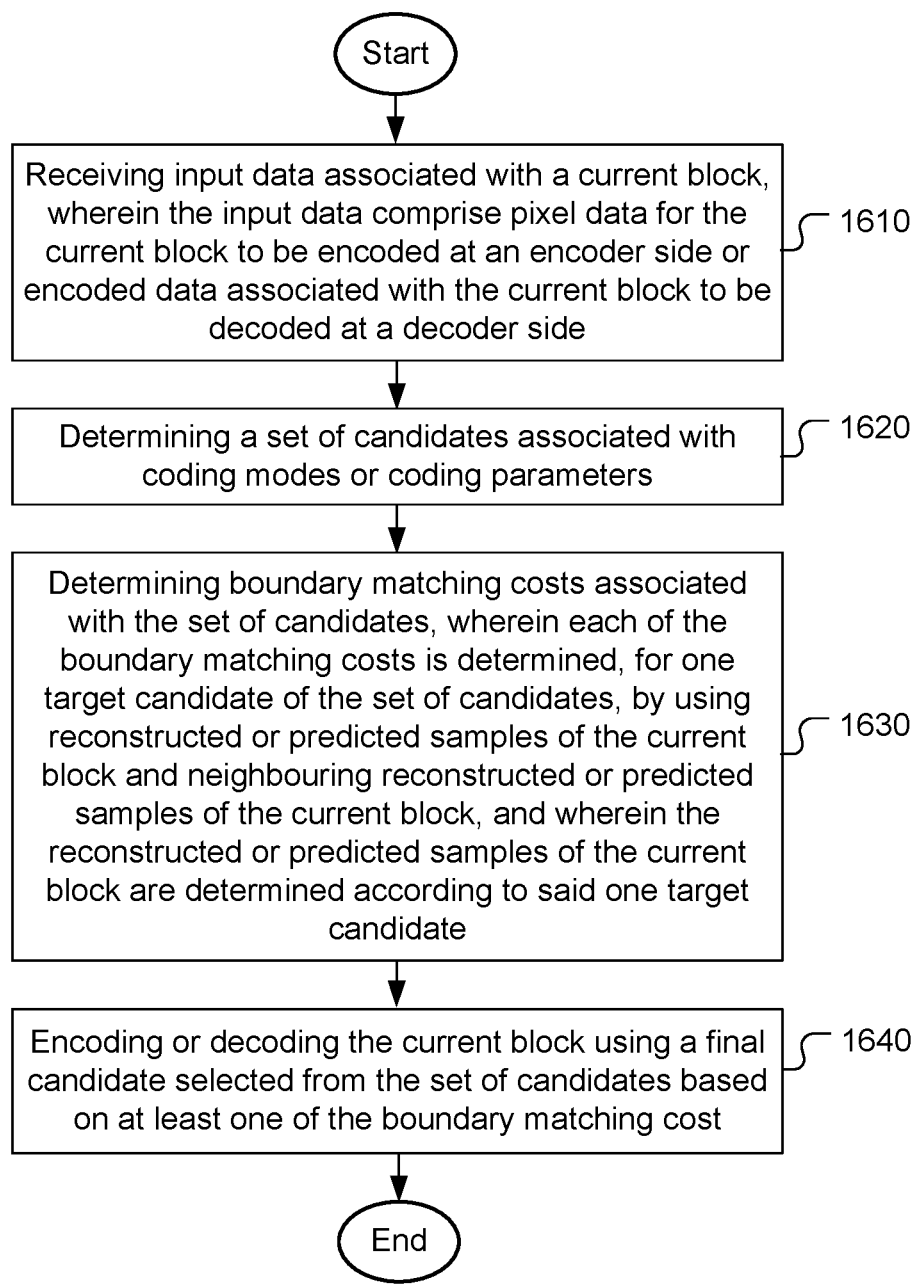
FIG. 16 illustrates a flowchart of an exemplary video coding system that utilizes reordering mode candidates based on boundary matching costs according to an embodiment of the present invention.

FIG. 16 illustrates a flowchart of an exemplary video coding system that utilizes reordering mode candidates based on boundary matching costs according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current block are received in step 1610, wherein the input data comprise pixel data for the current block to be encoded at an encoder side or encoded data associated with the current block to be decoded at a decoder side. A set of candidates associated with coding modes or coding parameters is determined in step 1620. Boundary matching costs associated with the set of candidates are determined in step 1630, wherein each of the boundary matching costs is determined, for one target candidate of the set of candidates, by using reconstructed or predicted samples of the current block and neighbouring reconstructed or predicted samples of the current block, and wherein the reconstructed or predicted samples of the current block are determined according to said one target candidate. The current block is encoded or decoded using a final candidate selected from the set of candidates based on at least one of the boundary matching cost in step 1640.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
receiving input data associated with a current block, wherein the input data comprise pixel data for the current block to be encoded at an encoder side or encoded data associated with the current block to be decoded at a decoder side;
determining a set of candidates associated with coding modes or coding parameters;
determining boundary matching costs associated with the set of candidates, wherein each of the boundary matching costs is determined, for one target candidate of the set of candidates, by using reconstructed or predicted samples of the current block and neighbouring reconstructed or predicted samples of the current block, and wherein the reconstructed or predicted samples of the current block are determined according to said one target candidate; and
encoding or decoding the current block using a final candidate selected from the set of candidates based on at least one of the boundary matching costs.

2. The method of claim 1, wherein the set of candidates corresponds to a set of merge candidates associated with merge coding mode.

3. The method of claim 2, wherein merge indexes are assigned to the set of merge candidates, and wherein a first merge index is assigned a smallest index value for a first merge candidate resulting in a smallest boundary matching cost and a second merge index is assigned a largest index value for a second merge candidate resulting in a largest boundary matching cost.

4. The method of claim 2, wherein merge indexes are assigned to the set of merge candidates and a target merge index for a selected merge candidate is signalled at the encoder side or received at the decoder side.

5. The method of claim 2, wherein merge indexes are assigned to the set of merge candidates and a target merge index for a selected merge candidate resulting in a smallest boundary matching cost is determined implicitly at the encoder side and the decoder side.

6. The method of claim 1, wherein the set of candidates corresponds to a set of LM (Linear Model) candidates associated with LM prediction between different colour component.

7. The method of claim 6, wherein the set of LM candidates comprises at least two LM candidates from a group including Top-Left LM, Top-only LM, Left-only LM and MM (Multiple Model) LM.

8. The method of claim 6, wherein LM indexes are assigned to the set of LM candidates, and a target LM index is assigned a smallest index value for a target LM candidate resulting in a smallest boundary matching cost.

9. The method of claim 6, wherein a target LM candidate resulting in a smallest boundary matching cost is selected as the final candidate implicitly.

10. The method of claim 1, wherein the set of candidates corresponds to a set of MMVD (Merge Mode with MVD) candidates, wherein each MMVD candidate includes a combination of offset direction and offset distance from a base merge candidate.

11. The method of claim 10, wherein MMVD indexes are assigned to the set of MMVD candidates, and a target MMVD index is assigned a smallest index value for a target MMVD candidate resulting in a smallest boundary matching cost.

12. The method of claim 10, wherein a target MMVD candidate resulting in a smallest boundary matching cost is selected as the final candidate implicitly.

13. The method of claim 1, wherein said each of the boundary matching costs is determined as a sum of first boundary matching costs, second boundary matching costs, third boundary matching costs and fourth boundary matching costs or any combination thereof, wherein the first boundary matching costs are determined for first line pixels in a left line of the current block, the second boundary matching costs are determined for second line pixels in a left neighbouring line of the current block, the third boundary matching costs are determined for first row pixels in a top line of the current block and the fourth boundary matching costs are determined for second row pixels in a top neighbouring line of the current block.

14. The method of claim 13, wherein each first boundary matching cost is determined for each first line pixel based on a first weighted difference between said each first line pixel and two horizontal adjacent pixels of said each first line pixel; each second boundary matching cost is determined for each second line pixel based on a second weighted difference between said each second line pixel and two horizontal adjacent pixels of said each second line pixel; each third boundary matching cost is determined for each first row pixel based on a third weighted difference between said each first row pixel and two vertical adjacent pixels of said each first row pixel; and each fourth boundary matching cost is determined for each second row pixel based on a fourth weighted difference between said each second row pixel and two vertical adjacent pixels of said each second row pixel.

15. The method of claim 14, wherein said each first boundary matching cost is determined as (2*value of said each first line pixel—values of two horizontal adjacent pixels of said each first line pixel); said each second boundary matching cost is determined as (2*value of said each second line pixel—values of two horizontal adjacent pixels of said each second line pixel); said each third boundary matching cost is determined as (2*value of said each first row pixel—values of two vertical adjacent pixels of said each first row pixel); said each fourth boundary matching cost is determined as (2*value of said each second row pixel—values of two horizontal adjacent pixels of said each second row pixel); and wherein a prediction value is used for a target pixel when the target pixel is in the current block and a reconstruction value is used for the target pixel when the target pixel is in a neighbouring area of the current block.

16. The method of claim 1, further comprising reordering the set of candidates according to the boundary matching costs.

17. An apparatus for video coding, the apparatus comprising one or more electronics or processors arranged to:
receive input data associated with a current block, wherein the input data comprise pixel data for the current block to be encoded at an encoder side or encoded data associated with the current block to be decoded at a decoder side;
determine a set of candidates associated with coding modes or coding parameters;
determine boundary matching costs associated with the set of candidates, wherein each of the boundary matching costs is determined, for one target candidate of the set of candidates, by using reconstructed or predicted samples of the current block and neighbouring reconstructed or predicted samples of the current block, and wherein the reconstructed or predicted samples of the current block are determined according to said one target candidate; and encode or decode the current block using a final candidate selected from the set of candidates based on reordered candidates of the set of candidates.

\* \* \* \* \*